United States Patent

Guardado et al.

[15] 3,693,723

[45] Sept. 26, 1972

[54] SELF-REVERSING REAR FURROW WHEEL ASSEMBLY FOR A MOUNTED REVERSIBLE DISK PLOW

[72] Inventors: Jose Cavazos Guardado, Alcatraz 31; Jorge Cervantes Talavera, Madero 303-A; Alcibiades Gonzalez Ibarra, Allende 13 Sur, all of Queretaro, Mexico

[22] Filed: May 12, 1971

[21] Appl. No.: 142,704

[52] U.S. Cl. ....................................172/212, 172/222

[51] Int. Cl. ............................A01b 3/16, A01b 3/40

[58] Field of Search...........172/161, 204, 210, 212, 220–222

[56] References Cited

UNITED STATES PATENTS

| | | | |
|---|---|---|---|
| 2,916,096 | 12/1959 | Miller et al. | 172/212 |
| 2,999,548 | 9/1961 | Wenzel | 172/222 |
| 3,319,721 | 5/1967 | Keplinger et al. | 172/212 |

FOREIGN PATENTS OR APPLICATIONS

| | | | |
|---|---|---|---|
| 1,075,836 | 10/1954 | France | 172/212 |
| 1,136,507 | 5/1957 | France | 172/212 |

*Primary Examiner*—Robert E. Pulfrey
*Assistant Examiner*—C. W. Hanor
*Attorney*—Gerhardt, Greenlee & Farris

[57] ABSTRACT

A mounted reversible disc plow with a headstock, a tool beam assembly pivotally mounted on the headstock, a plurality of tool posts pivotally mounted on the tool beam assembly, a disc rotatably supported by each tool post, disc positioning means to control the position of the tool posts, a reversing assembly and a furrow wheel assembly attached to the rear portion of the tool beam assembly. The furrow wheel assembly includes a furrow wheel support assembly, a furrow wheel axle assembly and a furrow wheel. The furrow wheel support assembly is pivotally attached to the tool beam assembly for pivotal movement about an axis transverse to a vertical plane through the longitudinal axis of the tool beam assembly. A stop limits movement of the rear portion of the furrow wheel support assembly down and away from the rectangular tube member of the tool beam assembly. An adjustable spring biases the furrow wheel support assembly toward the stop. The furrow wheel axle assembly extends to the rear of and is pivotally attached to the furrow wheel support assembly for limited pivotal movement about an axis in a vertical plane through the longitudinal axis of the tool beam assembly. The furrow wheel is rotatably attached to an adjustable arm on the furrow wheel axle assembly at a point spaced to the rear of the pivotal axis between the furrow wheel support assembly and the tool beam assembly.

5 Claims, 14 Drawing Figures

INVENTORS.
JOSE CAVAZOS GUARDADO
JORGE CERVANTES TALAVERA
ALCIBIADES GONZALEZ IBARRA
BY
Gerhardt, Greenlee & Farris
ATTORNEYS.

INVENTORS.
JOSE CAVAZOS GUARDADO
JORGE CERVANTES TALAVERA
ALCIBIADES GONZALEZ IBARRA
BY
Gerhardt, Greenlee & Farris
ATTORNEYS.

INVENTORS.
JOSE CAVAZOS GUARDADO
JORGE CERVANTES TALAVERA
ALCIBIADES GONZALEZ IBARRA
BY
Gerhardt, Greenlee & Farris
ATTORNEYS.

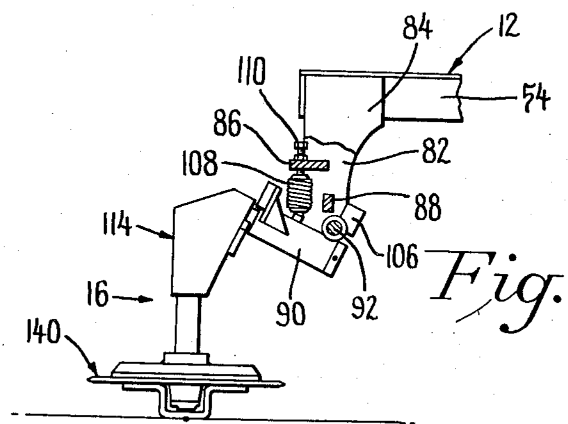
Fig. 11
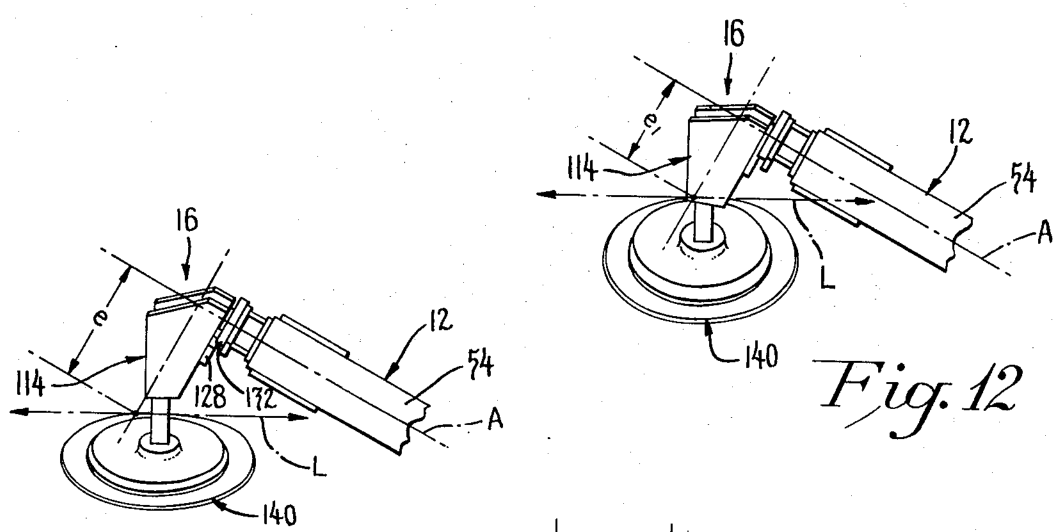
Fig. 12
Fig. 13
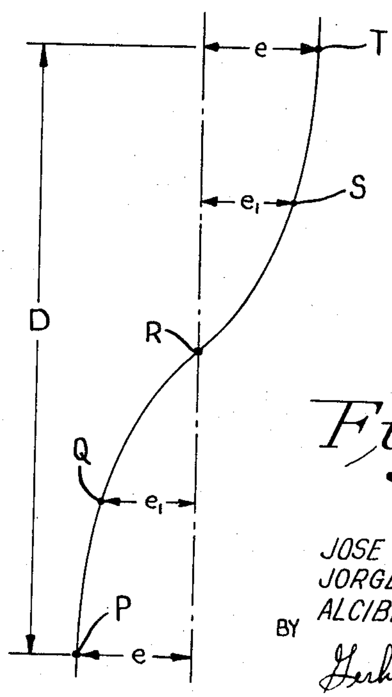
Fig. 14
INVENTORS.
JOSE CAVAZOS GUARDADO
JORGE CERVANTES TALAVERA
ALCIBIADES GONZALEZ IBARRA
BY
Gerhardt, Greenlee & Farris
ATTORNEYS.

SELF-REVERSING REAR FURROW WHEEL ASSEMBLY FOR A MOUNTED REVERSIBLE DISK PLOW

This invention relates to improvements in a reversible disc plow. More specifically, the invention concerns a furrow wheel assembly for a reversible disc plow.

The use of furrow wheels on disc plows is necessary to counteract the side thrust on the implement due to soil forces on the discs. Some furrow wheels on disc plows rotate about a horizontal axis while others rotate about on inclined axis. It is generally preferable to rotate the furrow wheel about an axis which is inclined in such a way that the side thrust on the implement tends to hold the furrow wheel into the soil. This is due to the fact that the vertical forces on a furrow wheel for a disc plow are usually relatively small.

When a disc plow is reversed it is also necessary to reverse the furrow wheel in one way or another. Some reversible disc plows employ two furrow wheels and a mechanical shifting mechanism. One of the furrow wheels is employed when the plow is plowing in one direction. When the plow is reversed the mechanical shifting mechanism shifts the furrow wheels so that the other furrow wheel is employed.

Another type of disc plow employs only one furrow wheel and uses a mechanical shifting mechanism to shift the furrow wheel when the plow is reversed.

A free swinging furrow wheel is employed on some disc plows. When the plow is raised off the ground by the draft vehicle, the furrow wheel swings down due to the force of gravity. Most of the time the free swinging furrow wheel will move up into the proper position when the plow is lowered. However, the furrow wheel will occasionally move up into the wrong position when the plow is lowered. This is usually due to the tractor running through a rut and swinging the furrow wheel toward the wrong side at the same time the plow is lowered.

Some reversible plows with free swinging furrow wheels employ shiftable stops which are designed to prevent the furrow wheel from moving toward the wrong side. These stops are usually attached to the tool post for the rear disc. With reversible plows which do not employ moveable stops to prevent the free swinging furrow wheel from moving into an improper position, it is generally necessary to lift the plow up and reposition the free swinging furrow wheel.

The reversible disc plow of this invention employs a free swinging furrow wheel which will move from the incorrect position to the correct position without lifting the discs out of engagement with the soil. The furrow wheel assembly includes a furrow wheel support assembly pivotally attached to the rear portion of the tool beam assembly for pivotal movement about an axis transverse to the longitudinal axis of the tool beam assembly. A furrow wheel axle assembly is rotatably journaled to the furrow wheel support assembly for pivotal movement about an axis in the same plane as the longitudinal axis of the tool beam assembly. A furrow wheel is rotatably attached to the end of an arm on the furrow wheel axle assembly that extends out from the axis about which the furrow wheel axle assembly pivots relative to the furrow wheel support assembly and toward the forward portion of the tool beam assembly. Abutment surfaces on the furrow wheel support assembly and the furrow wheel axle assembly limit pivotal movement of the axle assembly relative to the furrow wheel support assembly to position the furrow wheel in either a right hand or a left hand plowing position. Abutment surfaces on the furrow wheel support assembly and the tool beam assembly limit movement of the furrow wheel away from the tool beam assembly. A spring is provided to bias the abutment surface on the furrow wheel support assembly toward the abutment surface on the tool beam assembly. The spring is capable of allowing the furrow wheel to move from one plowing position to the other plowing position without lifting the discs out of the ground.

In the drawings:

FIG. 11 is a side elevation of the rear portion of the reversible disc plow as shown in FIG. 10;

FIG. 12 is a top plan view of the rear portion of a reversible disc plow in the right hand plowing position with the furrow wheel between a vertically down position and the right hand plowing position;

FIG. 13 is a top plan view of the rear portion of a reversible disc plow showing the furrow wheel in the right hand plowing position; and FIG. 14 is a schematic view showing the movement of the furrow wheel from the position shown in FIG. 8 to the position shown in FIG. 13 as the plow moves forward.

Figure 1:
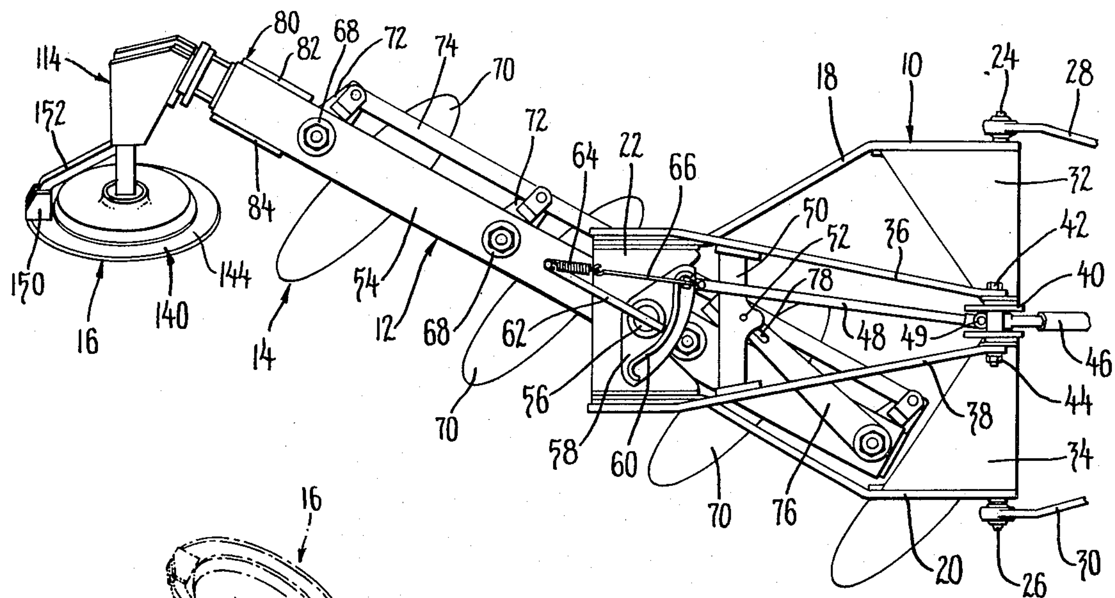
FIG. 1 is a top plan view of the reversible disc plow of this invention in the right hand plowing position.
Figure 2:
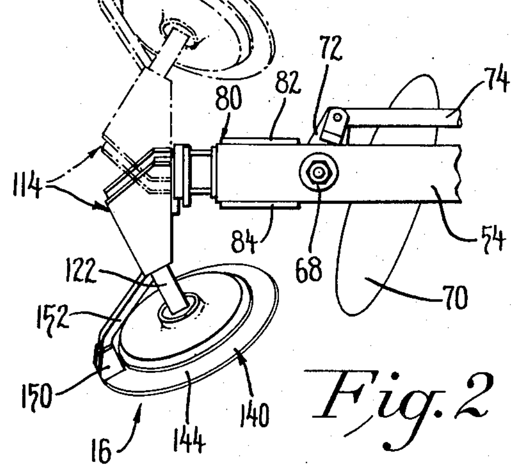
FIG. 2 is a top plan view of the rear end of the reversible disc plow showing the furrow wheel in full line in the right hand plowing position and in broken lines in the left hand plowing position.
Figure 3:
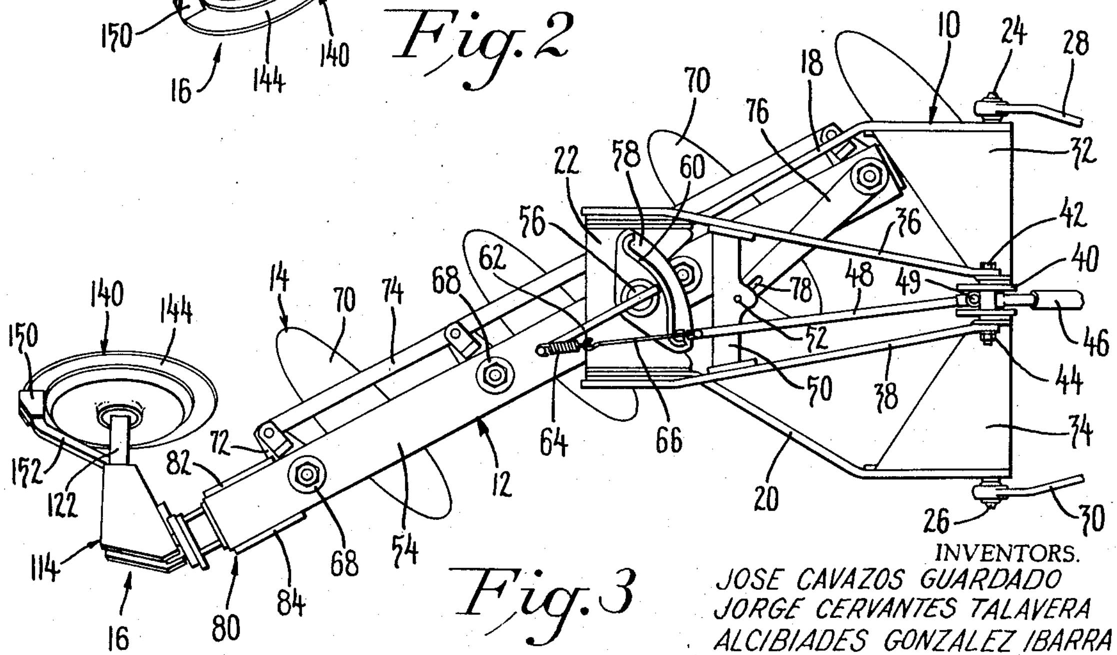
FIG. 3 is a top plan view of the reversible disc plow of this invention in the left hand plowing position.

The reversible disc plow as shown in FIGS. 1 and 3 includes a headstock 10, a tool beam assembly 12, earthworking tools 14, and a furrow wheel assembly 16.

The headstock 10 includes two horizontal side frame members 18 and 20. A rectangular tube member 22 is rigidly connected between the horizontal side frame members 18 and 20 at the rear of the headstock 10. Connecting pins 24 and 26 are connected to the front portions of the horizontal side frame members 18 and 20. The lower draft links 28 and 30 of a draft vehicle (not shown) are connected to the connecting pins 24 and 26 when the plow is in operation. A mast is formed on the forward portion of the headstock 10 by a pair of plate members 32 and 34 attached to the forward portions of the horizontal side frame members 18 and 20. A brace member 36 is attached to the upper portions of the plate member 32 and to the rectangular tube member 22. Another brace member 38 is attached to the upper portion of the plate member 34 and to the rectangular tube member 22. A bell crank 40 is pivotally attached to the top of the mast by a bolt 42 which passes through apertures in the brace member 36, the upper portion of plate member 32, the bell crank 40, the upper portion of plate member 34 and the brace member 36. The bolt 42 is held in position by a nut 44. The upper free arm of the bell crank 40 is connected to the upper draft link 46 of the draft vehicle when the plow is in use. The lower free arm of the bell crank 40 is attached to a compression rod 48 by a universal joint 49 for reversing the plow. A cam support plate 50 is rigidly attached to the headstock 10 between the brace members 36 and 38. A pin member 52 is rigidly attached to the cam support plate 50 and extends vertically down from the cam support plate 50 to form a cam.

The tool beam assembly 12 includes a rectangular tube 54. The rectangular tube 54 extends through the rectangular tube member 22 of the headstock 10. The rectangular tube 54 is pivotally supported on the headstock 10 by a shaft 56. The shaft 56 is rigidly connected to the rectangular tube 54 of the tool beam assembly 12 and has both ends rotatably journaled in the rectangular tube member 22 of the headstock 10. A cam support plate 58 is non rotatably attached to the portion of the shaft 56 which extends through the top of the rectangular tube member 22. An arcuate cam member 60 with stops at each end is attached to the top of the cam support plate 58. A spring support member 62 is rigidly attached to, and extends to, the rear of the cam support plate 58. In order to reverse the plow, it is first raised by the tractor draft links 28 and 30. The entire plow tends to rotate about the axis of the connecting pins 24 and 26 which are supported by the lower draft links 28 and 30 of the draft vehicle. This results in a tension load on the upper draft link 46 which tends to rotate the bell crank 40 and places a compression load on the compression rod 48. The operator then releases a latch (not shown) which prevents the tool beam assembly 12 from rotating relative to the headstock 10 about the axis of the shaft 56. After the latch is released, the tool beam assembly 12 rotates about the axis of the shaft 56 due to the force exerted on the arcuate cam member 60 by the compression rod 48. The tool beam assembly 12 is automatically latched by a latch means (not shown) after the tool beam assembly 12 has been shifted. Upon lowering the plow to the ground, the compression force exerted on the compression rod 48 by the bell crank 40 is released. The spring 64 which is connected to the spring support member 62 and to the compression rod 48 by a connection member 66 pulls the compression rod 48 from one end of the arcuate cam member 60 to the other end of the arcuate cam member 60 where it is in position to reverse the tool beam assembly 12 again as shown in FIGS. 1 and 3.

The earthworking tools 14 include a plurality of tool posts 68 rotatably supported by the rectangular tube 54 for pivotal movement about a vertical axis at points spaced along the length of the rectangular tube. A disc 70 is rotatably journaled to each of the tool posts 68 below the rectangular tube 54. A crank arm 72 extends out from each of the tool posts 68. A push-pull bar 74 is pivotally attached to each of the crank arms 72 to hold all of the tool posts 68 and the discs 70 in the same position relative to each other. The tool posts 68 and the discs 70 are positioned and shifted relative to the rectangular tube 54 by a disc positioning arm 76. The disc positioning arm 76 is non rotatably attached at one end to the top of the front tool post 68. The other end of the disc positioning arm 76 has an elongated slot 78. The pin member 52 on the cam support plate 50 of the headstock 10 engages the sides of the elongated slot 78 to shift all the tool posts 68 and the discs 70 relative to the rectangular tube 54 when the tool beam assembly 12 is rotated about the axis of the shaft 56 relative to the headstock 10.

Figure 4:
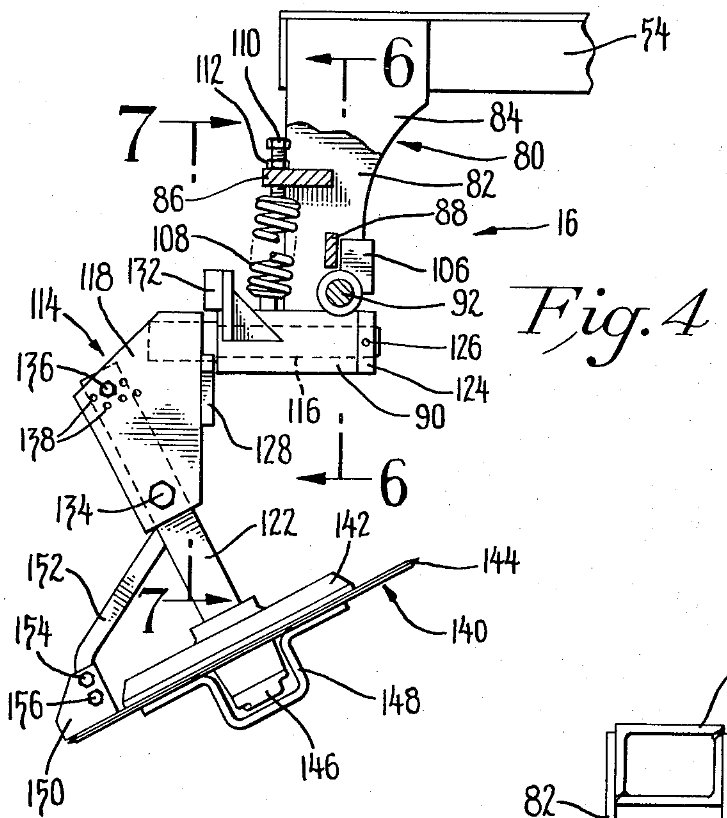
FIG. 4 is a side elevational view of the rear portion of the reversible disc plow showing the furrow wheel hanging down.
Figure 5:
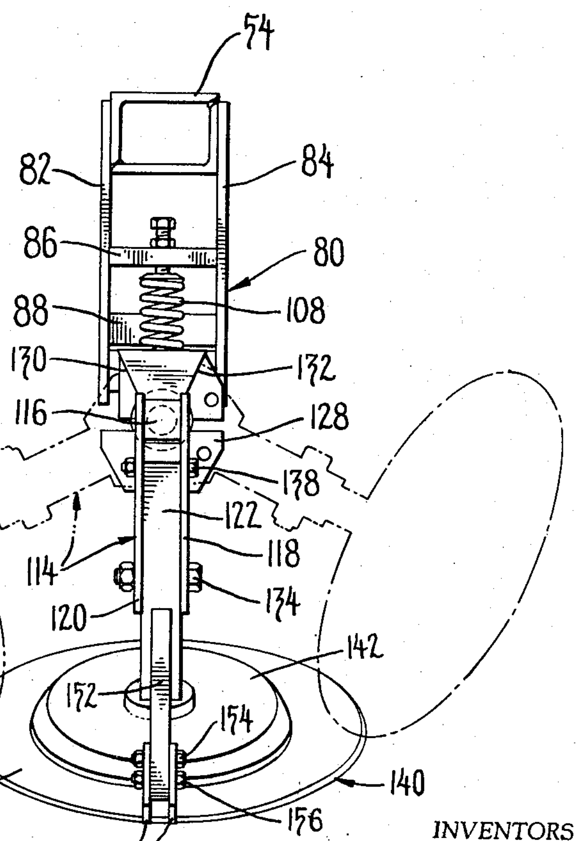
FIG. 5 is a rear elevation of the rear end of the reversible disc plow showing the furrow wheel hanging down in full lines and showing the furrow wheel in right and left hand plowing positions in broken lines.
Figure 6:
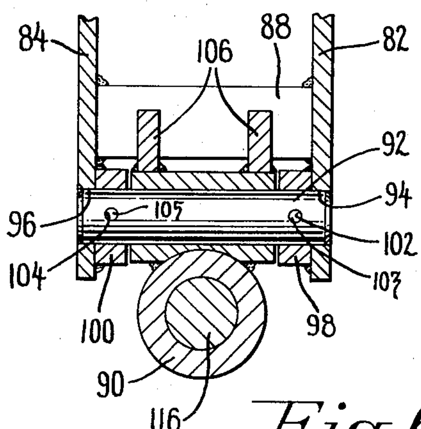
FIG. 6 is a sectional view taken along lines 6—6 of FIG. 4.
Figure 7:
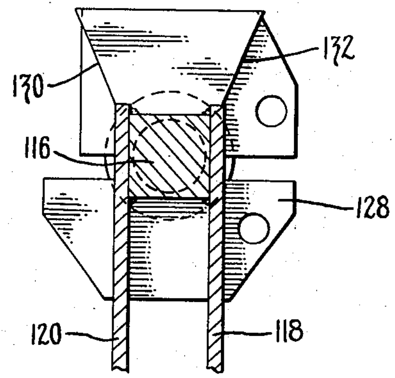
FIG. 7 is a sectional view taken along lines 7—7 of FIG. 4.

A furrow wheel assembly 16 is attached to a vertically downward extending furrow wheel bracket 80 on the rear portion of the tool beam assembly 12. The furrow wheel bracket 80 includes plates 82 and 84 welded to the sides of the rectangular tube 54. Cross braces 86 and 88 are welded between the plates 82 and 84 as shown in FIGS. 4, 5, 6 and 11. The furrow wheel assembly 16 includes a furrow wheel support assembly 90. The furrow wheel support assembly 90 is rotatably attached to the tool beam assembly 12 for pivotal movement about an axis perpendicular to a vertical plane through the longitudinal axis of the tool beam assembly 12 by a pin 92 which extends through apertures 94 and 96 in the plates 82 and 84, through spacers 98 and 100 welded to the plates 82 and 84 as shown in FIG. 6, and through the forward portion of the furrow wheel support assembly 90. Retainer pins 103 and 105 pass through the apertures 102 and 104 in the pin 92 and through aligned apertures in the spacers 98 and 100 to hold the pin 92 in position. Counterclockwise movement of the furrow wheel support assembly 90 about the axis of the pin 92 as shown in FIGS. 4 and 11 is limited by stop members 106 on the furrow wheel support assembly 90 contacting the cross brace 88.

A compression spring 108 applies force on the furrow wheel support assembly 90 and the cross brace 86. The compression spring 108 cushions the furrow wheel assembly 16 and tends to rotate the furrow wheel support assembly 90 in a counterclockwise direction as shown in FIGS. 4 and 11. The force exerted by the compression spring 108 can be adjusted by screwing the bolt 110 into or out of the cross brace 86. A lock nut 112 is provided to keep the bolt 110 from turning once the compression spring 108 has been adjusted.

A furrow wheel axle assembly 114, as best shown in FIG. 4, includes a shaft 116 rotatably journaled in the furrow wheel support assembly 90, a pair of parallel plates 118 and 120 rigidly attached to the shaft 116 and an arm 122 connected to the parallel plates 118 and 120. The shaft 116 is rotatable within the furrow wheel support assembly 90 about an axis which is in a vertical plane through the longitudinal axis of the rectangular tube 54. A retainer ring 124 is attached to the forward end of the shaft 116 by a pin 126 to hold the furrow wheel axle assembly 114 in the furrow wheel support assembly 90. The parallel plates 118 and 120 are welded to the rear portion of the shaft 116. A stop plate 128 is welded to the forward edges of the parallel plates 118 and 120 so as to be in a plane perpendicular to the longitudinal axis of the shaft 116. The stop plate 128 contacts the abutment surfaces 130 or 132 on the rear portion of the furrow wheel support assembly 90 to limit pivotal movement of the furrow wheel axle assembly 114 about the axis of the shaft 116 and to position the furrow wheel axle assembly for left or right-hand plowing as shown in broken lines in FIG. 5. The arm 122 is pivotally supported at a point intermediate its ends and between the parallel plates 118 and 120 by a bolt 134. The angle between the arm 122 and the axis of the shaft 116 is adjusted by pivoting the arm 122 about the axis of the bolt 134 and holding the arm 122 in one of the pre selected positions by passing the bolt 136 through the selected hole 138 in the parallel plates 118 and 120, and through one of the holes in the arm 122.

A furrow wheel 140 is rotatably journaled to the free end of the arm 122 of the furrow wheel axle assembly 114 at a point spaced to the rear of the pin 92 as shown in FIGS. 4 and 11. The furrow wheel 140 includes a hub 142, a disc 144 rigidly attached to the hub, a cap 146 for the bearings in the hub 142, and a guard 148 to prevent damage to the cap 146 by rocks or other obstructions.

A pair of scraper blades 150 are secured to a scraper support 152 by a pair of bolts 154 and 156 to keep the disc 144 clean. The scraper support 152 is preferably welded to the arm 122.

The furrow wheel 140 rotates about the axis of the arm 122 of the furrow wheel axle assembly 114 which is inclined relative to a horizontal plane when the furrow wheel axle assembly is in one of the working positions. The furrow wheel 140 is inclined so as to utilize the side draft forces on the implement to force the disc 144 into the furrow wall behind by the last disc 70.

The operation of the furrow wheel assembly 16 will now be described with reference to FIGS. 8 through 14, inclusive. FIGS. 8 through 13, inclusive, show the position of the furrow wheel assembly 16 relative to the tool beam assembly 12 as the furrow wheel moves from the incorrect position relative to the tool beam assembly 12 to the correct position and the reversible disc plow moves parallel to the line L. FIG. 14 shows the movement of the furrow wheel 140 schematically as it moves from the position illustrated in FIG. 8 to the position illustrated in FIG. 13.

Figure 8:
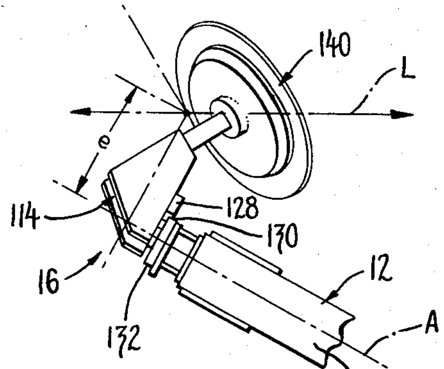
FIG. 8 is a top plan view of the rear portion of a reversible disc plow in the right hand plowing position with the furrow wheel in the left hand position.

In FIG. 8 the tool beam assembly is in the right-hand plowing position as shown in FIG. 1. The furrow wheel assembly 16 is in the left-hand plowing position, however, with the stop plate 128 against the abutment surface 130 on the furrow wheel support assembly 90. The position of the furrow wheel illustrated in FIG. 8 is represented by the position P in FIG. 14.

Figure 9:
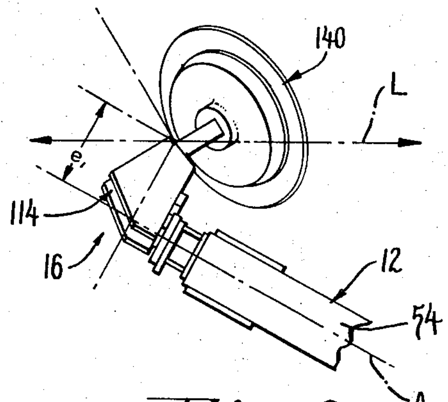
FIG. 9 is a top plan view similar to FIG. 8 after the furrow wheel has moved part way from the left hand plowing position.
Figure 10:
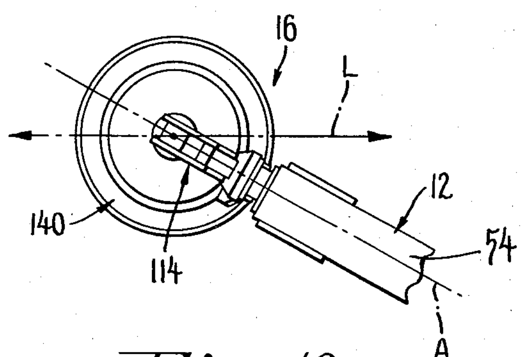
FIG. 10 is a view similar to FIG. 8 after the furrow wheel has moved to a position vertically down from the tool beam assembly.

As the reversible disc plow moves forward parallel to the line L, the soil forces on the furrow wheel 140 cause the furrow wheel axle assembly 114 to rotate about the axis of the shaft 116 and to assume the position illustrated in FIG. 9 and represented by the position Q in FIG. 14. As the furrow wheel axle assembly 114 rotates about the axis of the shaft 116 the point at which the furrow wheel 140 contacts the ground moves closer to a vertical plane through the longitudinal axis A of the tool beam assembly 12 as indicated by the distance $e_1$. As the reversible disc plow continues to move forward, the furrow wheel axle assembly 114 continues to rotate about the axis of the shaft 116 until the furrow wheel is in the position illustrated in FIGS. 10 and 11 and represented by the position R in FIG. 14. With the furrow wheel in this position, the compression spring 108 is compressed to lower the tool beam assembly 12 relative to the furrow wheel 140 as clearly illustrated in FIG. 11. The compression spring 108 allows the furrow wheel 140 to move up relative to the tool beam assembly 12 a sufficient distance to leave the discs 70 in engagement with the soil. If the discs 70 were raised out of the ground, the side thrust on the disc would decrease, the plow would move sideways due to the force exerted by the draft links and the plow would return to the position illustrated in FIG. 8.

Since the side thrust on the plow due to the soil forces on the discs 70 continues to force the plow to one side, as the plow continues to move forward, the furrow wheel axle assembly 114 continues to rotate about the axis of the shaft 116 and moves to the position illustrated in FIG. 12 and represented by the position S in FIG. 14.

Further forward movement of the plow parallel to the line L results in the furrow wheel 140 moving further from the vertical plane through the axis of the tool beam assembly 12 until it is a distance $e$ from the plane as illustrated in FIG. 13 and represented by the position T in FIG. 14. While the furrow wheel moves from the point P to point T, the plow moves forward a distance D. The distance D is less than 5 meters. In the position illustrated in FIG. 13, the stop plate 128 on the furrow wheel axle assembly 114 is in contact with the abutment surface 132 on the furrow wheel support assembly 90. In this position, the furrow wheel rotates about an axis in a plane which is approximately perpendicular to the direction of movement of the plow and counteracts most of the side thrust on the tool beam assembly 12. The furrow wheel may be turned slightly to one side by adjusting the position of the arm 122 relative to the parallel plates 118 and 120. In this way the furrow wheel 140 can be adjusted to take the side thrust on the tool beam assembly 12.

We claim:

1. Improvements in a reversible disc plow including a headstock adapted to be connected to a draft vehicle, a tool beam assembly journaled on the headstock for limited pivotal movement about a generally vertical axis, a plurality of tool posts journaled on the tool beam assembly for limited pivotal movement about generally vertical axes, a disc rotatably supported by each tool post, disc positioning means to control the position of all the tool posts relative to the tool beam assembly, and a furrow wheel assembly characterized by a furrow wheel support assembly pivotally attached to the rear portion of the tool beam assembly for pivotal movement about an axis transverse to the longitudinal axis of the tool beam assembly, a furrow wheel axle assembly rotatably journaled to the furrow wheel support assembly for pivotal movement about an axis in the same plane as the longitudinal axis of the tool beam assembly, an arm on the furrow wheel axle assembly extending out from the axis about which the furrow wheel axle assembly pivots relative to the furrow wheel support assembly and toward the forward portion of the tool beam assembly, a furrow wheel rotatably attached to the end of the arm on the furrow wheel axle assembly, abutment surfaces on the furrow wheel support assembly and the furrow wheel axle assembly to limit pivotal movement of the axle assembly relative to the furrow wheel support assembly and to thereby position the furrow wheel in either the right hand or the left hand plowing position, abutment surfaces on the furrow wheel support assembly and the tool beam assembly to limit movement of the furrow wheel away from the tool beam assembly, and a spring for biasing the abutment surface on the furrow wheel support assembly toward the abutment surface on the tool beam assembly, said spring being capable of permitting the furrow wheel to move relative to the tool beam assembly from its right hand plowing position to its left hand plowing position without lifting the discs out of the ground.

2. The improved reversible disc plow of claim 1 characterized by the furrow wheel axle assembly including adjustment means to adjust the angle at which the arm on the furrow wheel axle assembly extends out from the axis about which the furrow wheel axle assembly pivots relative to the furrow wheel support assembly.

3. The improved reversible disc plow of claim 1 characterized by the furrow wheel axle assembly including a scraper to scrape mud from the furrow wheel.

4. The improved reversible disc plow of claim 1 characterized by adjustment means to adjust the force exerted on the furrow wheel support assembly by the spring.

5. The improved reversible disc plow of claim 4 characterized by the spring, for biasing the abutment surface on the furrow wheel support assembly toward the abutment surface on the tool beam assembly, consisting of a compression type coil spring.

* * * * *